United States Patent [19]

Ogasawara et al.

[11] 4,364,046
[45] Dec. 14, 1982

[54] ROTATION ANGLE DETECTING DEVICE

[76] Inventors: Hiroomi Ogasawara, 3821-4; Masaomi Ogasawara, 3833, both of Yamakita, Yamakita-Machi, Ashigarakami-Gun, Kanagawa-Ken, Japan

[21] Appl. No.: 74,570

[22] Filed: Sep. 11, 1979

[30] Foreign Application Priority Data

Sep. 11, 1978 [JP] Japan .................. 53-111412

[51] Int. Cl.³ .................. G01R 27/26; G01L 1/14; G08C 19/10
[52] U.S. Cl. .................. 340/870.37; 340/870.01; 73/DIG. 1; 73/DIG. 4; 73/579; 324/61 R; 324/79 D
[58] Field of Search ......... 340/200, 177 VA, 177 VC, 340/870.01, 870.06, 870.09, 870.37; 324/61 QS, 61 R, 79 R, 79 D; 331/37, 42, 40, 65, 1 A, 2, 36 R, 36 C; 73/DIG. 1, DIG. 3, DIG. 4, 579; 323/93; 318/662

[56] References Cited

U.S. PATENT DOCUMENTS

| | | | |
|---|---|---|---|
| 2,613,249 | 10/1952 | Babb | 324/61 QS |
| 2,675,540 | 4/1954 | Schultheis | 340/184 |
| 3,221,256 | 11/1965 | Walden | 328/1 |
| 3,227,952 | 1/1966 | Proebster et al. | 324/79 D |
| 3,237,447 | 3/1966 | McKeown | 324/61 QS |
| 3,307,164 | 2/1967 | Zimmer | 340/200 |
| 3,671,857 | 6/1972 | Bergmanis et al. | 324/61 QS |
| 3,683,402 | 8/1972 | Parnell | 340/200 |
| 3,702,467 | 11/1972 | Melnyk | 340/200 |
| 3,860,918 | 1/1975 | Cencel | 340/200 |
| 3,879,660 | 4/1975 | Piso | 324/61 R |
| 3,938,077 | 2/1976 | Nakanishi et al. | 340/539 |
| 3,990,005 | 11/1976 | Abbe et al. | 324/61 R |
| 4,227,182 | 10/1980 | Ogasawara et al. | 73/579 |

*Primary Examiner*—Thomas A. Robinson
*Assistant Examiner*—Donnie L. Crosland
*Attorney, Agent, or Firm*—Beveridge, De Grandi & Kline

[57] ABSTRACT

A rotation angle detecting device with a pair of variable capacitors which are formed with a rotating object, i.e. a movable electrode, and two stationary electrodes disposed around the rotating object, so that the capacitors operate in a differential mode. Alternatively, the central electrode can be stationary while the two outer electrodes move with the rotating object. The capacitors are combined with oscillators, so that a signal varying with the rotation of the rotating object is provided by obtaining the difference between the output frequencies of the oscillators.

10 Claims, 9 Drawing Figures

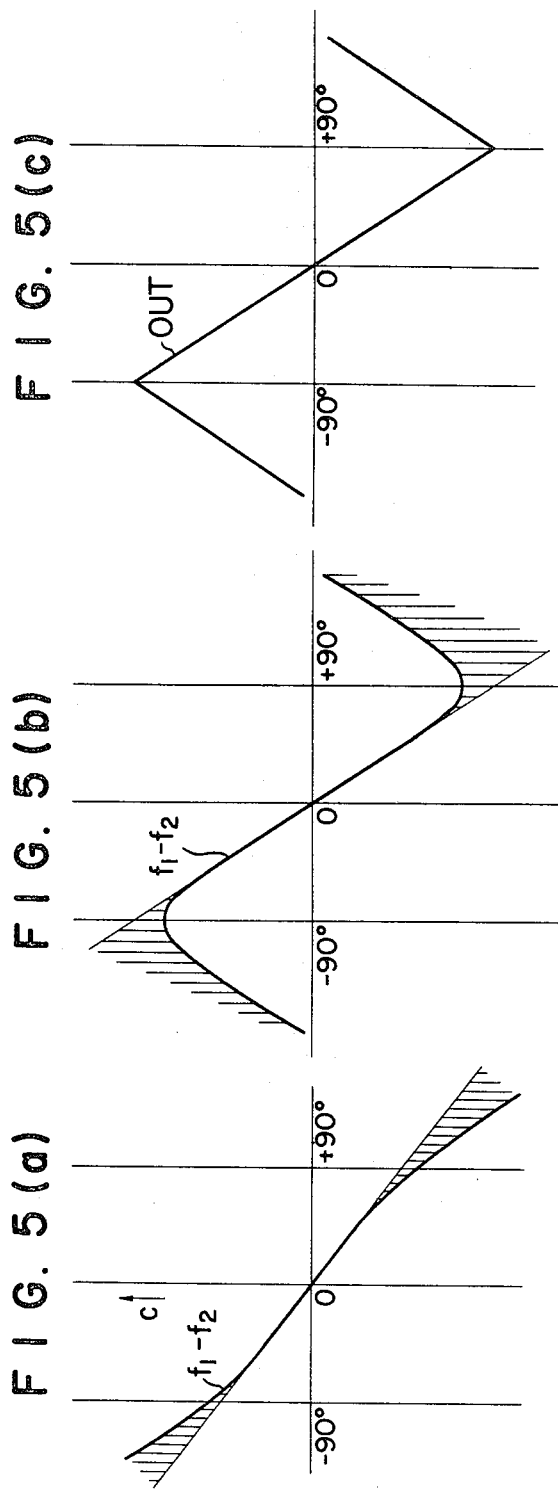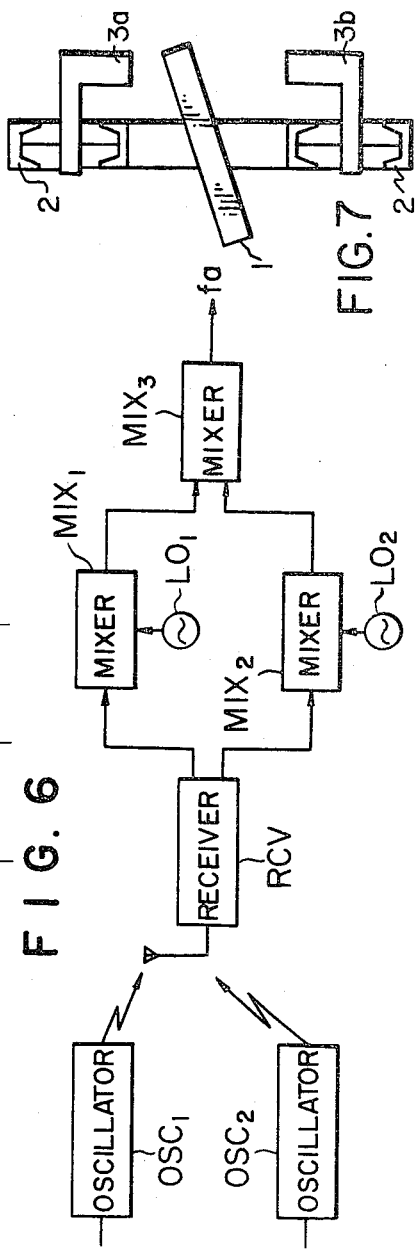

ROTATION ANGLE DETECTING DEVICE

BACKGROUND OF THE INVENTION

This invention relates to a rotation angle detecting device for forming a signal which varies in response to the angle of rotation of a rotating object.

Heretofore, in order to form a sinusoidal signal corresponding to the rotation of a rotating object, a rotary type variable resistor having a resistance pattern in the form of a sine wave and having its slider coupled to the rotating object has been utilized. With the rotary type variable resistor, the resistance value is varied in the form of a sine wave with the rotation of the rotating object.

However, this means is disadvantageous in that it is difficult to manufacture the resistance pattern for the variable resistor, and the variable resistor is low in durability.

SUMMARY OF THE INVENTION

Accordingly, an object of this invention is to provide a rotation angle detecting device which can be readily manufactured, and which is high in durability and high in accuracy.

The foregoing object and other objects of the invention have been achieved by the provision of a rotation angle detecting device comprising: a rotating movable electrode in the form of an eccentric cam or an inclined plate; a pair of stationary electrodes provided around the movable electrode; a pair of capacitors conducting differential operation by cooperation of the three electrodes; a pair of oscillators operatively combined with the pair of capacitors to provide outputs whose frequencies are varied with variations in capacitance of the capacitors, respectively; a mixer for providing a signal which responds to the difference between the outputs of the oscillators; and conversion means for converting the output of the mixer into a signal of a desired type. Alternatively, the eccentric cam or inclined plate can be stationary while the pair of electrodes rotates.

The principle, nature and utility of the invention will become more apparent from the following detailed description and the appended claims when read in conjunction with the accompanying drawings.

Figure 4:
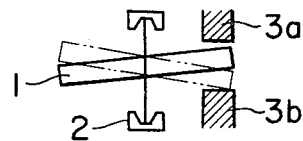
Figure 3A:
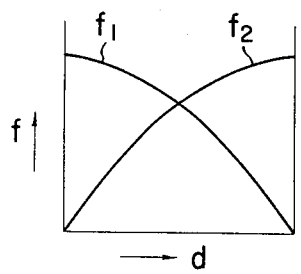
Figure 3B:
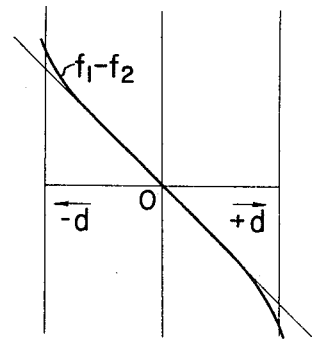

The parts (a) and (b) of FIG. 3 are characteristic diagrams for a description of the operating principle of the rotation angle detecting device of the invention;

FIG. 4 is a side view showing the arrangement of electrodes employed in another example of the rotation angle detecting device according to the invention;

The parts (a), (b) and (c) of FIG. 5 are characteristic diagrams for a description of the operation of a third example of the rotation angle detecting device according to the invention;

FIG. 6 is a block diagram illustrating another system of processing the outputs of oscillators in the rotation angle detecting device of the invention; and FIG. 7 is a side view showing the arrangement of electrodes employed in another example of the rotation angle detecting device of the invention.

DETAILED DESCRIPTION OF THE INVENTION

Figure 1:
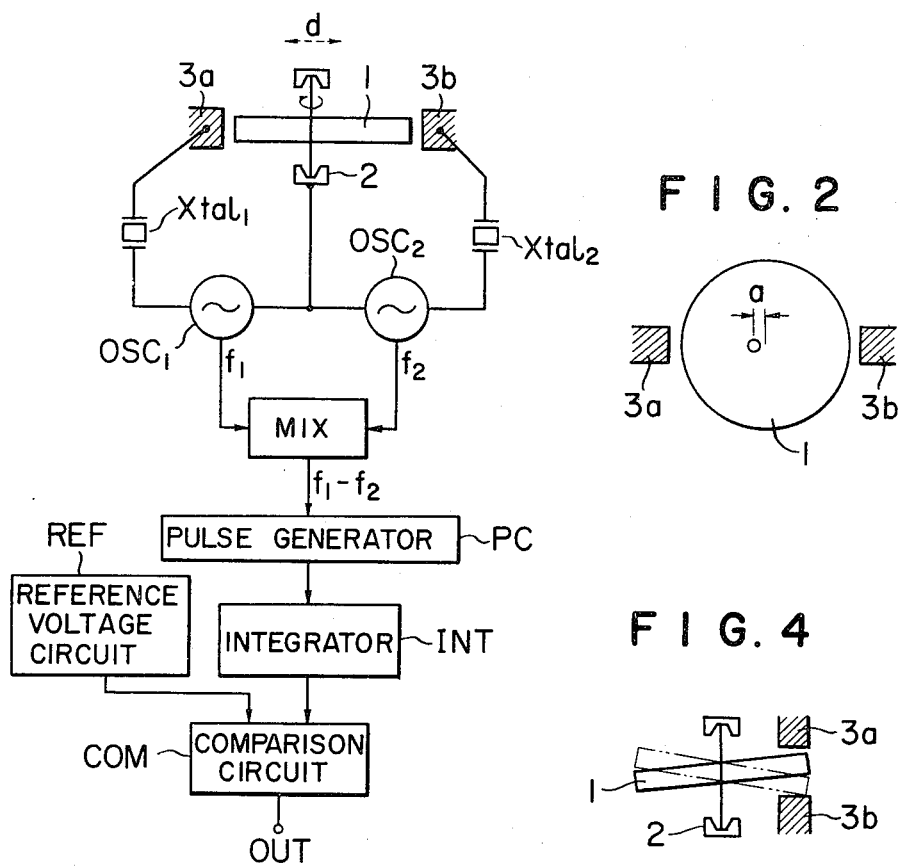
FIG. 1 is a block diagram illustrating one example of a rotation angle detecting device according to this invention.

One example of a rotation angle detecting device according to this invention is as shown in FIG. 1 in which reference numerals 1 and 2 designates a rotating object and its bearing means, respectively. The rotating object 1 and the bearing means 2 are made of electrically conductive material and are connected electrically to each other. A pair of stationary electrodes 3a and 3b are arranged at both sides of the rotating object 1 in such a manner that the stationary electrodes are on diametrically opposite sides of the rotating object 1. The distances between the stationary electrode 3a and the rotating object 1 and between the stationary electrode 3b and the rotating object 1 are changed as much as the amount of eccentricity a of the rotating object 1 as the object 1 is rotated. The change is sinusoidal with respect to the angle of rotation of the rotating object 1.

The bearing means 2 connected to the rotating object 1 is connected to the common connection point of oscillators $OSC_1$ and $OSC_2$ to which the stationary electrodes 3a and 3b are connected through crystal oscillating elements $Xtal_1$ and $Xtal_2$, respectively. The oscillators $OSC_1$ and $OSC_2$ provide outputs having frequencies $f_1$ and $f_2$, respectively. The outputs of the oscillators are applied to a mixer MIX, which in turn applies a signal in response to difference frequency $(f_1-f_2)$ to a pulse generator PC in which the signal in response to the difference frequency $(f_1-f_2)$ is converted into a pulse signal. The pulse signal is applied to an integrator INT. For the integration in the integrator, it is preferable that the pulse signal is such that the pulse width is constant and the pulse period is variable with the frequency. The output of the integrator INT is applied to a comparison circuit COM where it is compared with the output of a reference voltage circuit REF. The reference voltage circuit can be set to form a voltage signal having a predetermined value.

Figure 2:
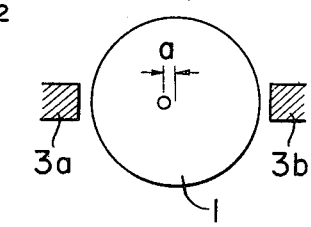
FIG. 2 is a plan view of electrodes employed in the device shown in FIG. 1.

FIG. 2 is a plan view showing the arrangement of the rotating object 1 and the stationary electrodes 3a and 3b. The rotating object is in the form of an eccentric cam. The stationary electrodes are disposed at both sides of the rotating object 1 in such a manner that they are on diametrically opposite sides of the rotating object 1, as was described before. In this connection, it is assumed that the amount of eccentricity a of the eccentric cam 1 is much smaller than the radius of the rotating object 1.

The parts (a) and (b) of FIG. 3 are graphical representations for a description of the outputs of the oscillators $OSC_1$ and $OSC_2$ and mixer MIX, which are provided in association with the rotating object 1 and the stationary electrodes 3a and 3b. For convenience in description, it is assumed that the rotating object 1 is not rotated, but moved horizontally as viewed in the figure. In FIGS. 1 and 3, reference character d designates the amount of movement of the rotating object. As the rotating object 1 is moved in the direction of the broken-line arrow d as indicated in FIG. 1, the output frequencies $f_1$ and $f_2$ of the oscillators $OSC_1$ and $OSC_2$ are varied nonlinearly as indicated in the part (a) of FIG. 3. The variations of the frequencies $f_1$ and $f_2$ are symmetrical with each other. Accordingly, if a characteristic curve $(f_1-f_2)$ is obtained, then it includes a substantially linear part, as indicated in the part (b).

On the other hand, in the case where the amount of eccentricity of the rotating object is much smaller than the radius thereof, the travel of the eccentric cam is in the form of a sine wave with respect to the angle of rotation of the eccentric cam. Therefore, if the eccentric cam is rotated, then the sinusoidal variation of the travel of the eccentric cam is superposed on the linear part of the characteristic curve indicated in the part (b) of FIG. 3. Accordingly, the output ($f_1 - f_2$) of the mixer MIX is varied in the form of a sine wave with respect to the angle of rotation of the eccentric cam. This variation is converted into a pulse, which is subjected to integration, and the result is compared with the reference signal. As a result, a sine wave output varying with the reference point as the center can be obtained.

FIG. 4 shows another arrangement of the rotating object 1 and the stationary electrodes 3a and 3b. In this case, the rotating object 1 is inclined with respect to its axis, and accordingly the rotating object 1 is swingably moved between the stationary electrodes 3a and 3b as it is rotated.

The parts (a), (b) and (c) of FIG. 5 are graphical representation for a description of the operation of another example of the rotation angle detecting device according to the invention. In this example, a substantially sinusoidal characteristic (the part (b) of FIG. 5) due to the eccentricity or inclination of the rotating object is superposed on the non-linear part of a substantially linear characteristic (the part (a) of FIG. 5) due to the differential operation of the movable electrode and the stationary electrodes, as a result of which a characteristic curve which is linear in the range of from $+90°$ to $-90°$ but like a triangular wave as a whole.

The configuration of the above-described sinusoidal characteristic curve can be changed as desired but to a certain extent by suitably selecting the sizes of the rotating object 1 and the stationary electrodes 3a and 3b and the distance between the electrodes. Accordingly, if the above-described substantially linear characteristic curve, including both end parts deviating greatly from its linear part, is superposed on the substantially sinusoidal characteristic curve, then the triangular-wave-like characteristic curve shown in a part (c) of FIG. 3 can be obtained. Since this characteristic curve changes its polarity, or bends, every predetermined angle of rotation, not only rotation angle detection utilizing the linear part but also rotation angle detection utilizing the rise and fall of the waveform can be carried out.

FIG. 6 illustrates another system of processing the outputs of the oscillators $OSC_1$ and $OSC_2$, in which the outputs of the oscillators $OSC_1$ and $OSC_2$ are transmitted by radio wave. The outputs of the oscillators $OSC_1$ and $OSC_2$ thus transmitted are received by a receiver RCV, and are applied to mixers $MIX_1$ and $MIX_2$ where they are mixed with local oscillation frequencies $LO_1$ and $LO_2$, respectively. Two output signals of the mixers $MIX_1$ and $MIX_2$, which are obtained by this frequency conversion, are mixed in a mixer $MIX_3$ to provide a measurement signal fa. The measurement signal fa thus provided can be processed similarly as in the case of the difference frequency ($f_1 - f_2$) in FIG. 1.

By the above-described system, the following difficulties can be eliminated. One of the difficulties is that, if the output frequency difference between the oscillators $OSC_1$ and $OSC_2$ is of the order of several KHz, then the signal interval is 0.2 to 0.3 millisecond, and therefore an object rotating at high speed cannot be followed. A second difficulty is that 10 to 20 MHz is most available as the output frequencies of the oscillators $OSC_1$ and $OSC_2$ when crystal oscillating elements are employed therefor; however, in the case where the outputs are applied to a simpler frequency-voltage converter, unlike the circuity shown in FIG. 1, to obtain voltage signals, the frequency is too high.

However, as a result of the frequency conversion, the signal interval becomes of the order of microseconds, and the signal variation component, or the several KHz, is not included in the range of error. Thus, a measurement signal which is excellent in response characteristic and readily processable can be obtained.

As is apparent from the above description, in the rotation angle detecting device according to the invention, a pair of variable capacitors operating in a differential mode are formed by the combination of one electrode which is a rotating object like an eccentric cam or an inclined plate and a pair of other electrodes provided around the rotating object, and these variable capacitors are combined with two oscillators, respectively, to provide a difference frequency between the output frequencies of the oscillators thereby to form a signal which varies in the form of a sine wave in response to the angle of rotation of the rotating object. Alternatively, the eccentric cam or inclined plate can be maintained as a stationary electrode while the pair of electrodes rotates with the rotating object, as shown by stationary electrode 1 and movable electrodes 3a and 3b in FIG. 7. Accordingly, the device according to the invention is free from the manufacture of a resistance pattern which is one of the difficulties accompanying the prior art. Furthermore, since the operation of the device of the invention is carried out in a contactless mode, the device is never worn. Thus, the device of the invention can be readily manufactured and is high in durability. In addition, since the obtained signal appears as frequency variation, it may be processed in a digital mode after being converted into a pulse, or if the pulse is subjected to analog conversion, then it can be utilized as a sine wave.

Moreover, a triangular-wave-like output can be obtained by suitably selecting the relation between the rotating object and the stationary electrodes.

What is claimed is:

1. A device for measuring the amount of rotation of a rotatable object comprising:
   (a) sensor means including a first electrode plate; a pair of second electrode plates confronting said first electrode plate and spaced therefrom by a first distance and a second distance respectively to form therewith a pair of capacitors; and means responsive to rotation of the rotatable object for producing relative rotation between (i) said first electrode plate and (ii) said pair of second electrode plates in an eccentric manner to vary the first distance and the second distance differentially so that as the rotatable object rotates the capacitance of one of the capacitors increases while the capacitance of the other of the capacitors correspondingly decreases differentially;
   (b) two oscillator circuits, each having an associated one of the capacitors incorporated therein as a frequency varying component; and
   (c) mixer means connected to said two oscillator circuits for providing a frequency difference signal determined by the difference in the frequencies of said two oscillator circuits and indicative of the extent of rotation of the rotatable object.

2. A device as claimed in claim 1 in which said first electrode plate is an eccentric cam.

3. A device as claimed in claim 1 in which said first electrode plate is a plate inclined at an acute angle with respect to a line interconnecting the plates of said pair of second electrode plates.

4. A device as claimed in claim 1 further comprising conversion means for converting the frequency difference signal into a signal of a desired type.

5. A device as claimed in claim 4 in which said conversion means comprises: a pulse generator for converting the frequency difference signal into a pulse signal; an integrator for integrating the pulse signal; a reference voltage source for providing a reference voltage signal having a predetermined value; and comparator means for comparing the reference voltage signal with the output of said integrator to provide an output signal corresponding to the comparison result.

6. A device as claimed in claim 1 in which said first electrode plate is adapted to rotate in response to rotation of the rotatable object and said pair of second electrode plates is stationary.

7. A device as claimed in claim 1 in which said pair of second electrode plates is adapted to rotate in response to rotation of the rotatable object and said first electrode plate is stationary.

8. A device as claimed in claim 1 in which the output frequency of said mixer means is linearly increased or decreased for every unitary amount of relative rotational motion between said first electrode plate and said pair of second electrode plates.

9. A device as claimed in claim 1 further comprising means for transmitting the outputs of said oscillators by radio wave.

10. A device as claimed in claim 1 further comprising a source of local oscillation frequencies connected to said mixer means for subjecting the outputs of said oscillators to frequency conversion to provide frequency converted signals and means for obtaining a difference frequency signal indicative of the difference between the frequencies of said frequency converted signals.

* * * * *